Patented Oct. 18, 1932

1,883,373

UNITED STATES PATENT OFFICE

CARL W. J. HEDBERG, OF MIDDLESEX, NEW JERSEY, ASSIGNOR TO RESEARCH CORPORATION, OF NEW YORK, N. Y., A CORPORATION OF NEW YORK

PURIFICATION OF BLAST FURNACE GASES

No Drawing. Application filed May 1, 1929. Serial No. 359,713.

This invention relates to the recovery of suspended materials from a stream of gas by the action of an electrical field between electrodes maintained at a high potential difference, as in the well-known Cottrell process.

The invention particularly relates to a method of electrical precipitation in which a conditioning agent is introduced into the gas stream carrying the suspended particles, which it is desired to recover or precipitate.

The conditioning agent which I employ is a hydrocarbon vapor, fog or mist, such as that obtained by vaporizing and partially condensing or spraying hydrocarbon compounds, such as oil, tar, pitch, or by addition of volatile products from destructive distillation of carbonaceous material. The process is particularly applicable to the electrical precipitation of dust, soot, lamp-black, or other suspended particles from hot, dry gases, such as the gases from iron blast furnaces, carbon black furnaces, gas producers and the like.

For example, in iron blast furnace practice, it is customary to remove the dust carried in suspension in the gases coming from the top of the furnace prior to use as gaseous fuel in hot-blast stoves and boilers. This is advantageously accomplished by electrical precipitation. I have found that by adding hydrocarbon vapors, fogs, or mists, to these furnace gases, the efficiency of the electrical precipitation is greatly increased in that with a given precipitator higher voltages may be used resulting in higher dust recoveries at equal or greater rates of treatment and lower power consumption. The amount of hydrocarbon vapor, fog or mist supplied to the gas may be not more than 0.5 grain per cubic foot of gas, though more or less than this amount may be used, according to circumstances.

The invention is applicable to the electrical precipitative treatment of gases even at high temperatures, and has been successfully used at temperatures about 600° F., a range high enough to include all industrial conditions heretofore encountered. The source of the hydrocarbon vapors, fogs or mists does not appear to be important, as I have used those obtained from oils and other hydrocarbon compounds whose boiling points varied from atmospheric temperatures to over 600° F.

The hydrocarbon vapors, fogs or mists may be added to the gas stream in a great variety of ways. For example, in treating blast furnace gases, the desired effect may be produced by adding bituminous coal, oil or tar at the top of the furnaces, these materials being distilled or vaporized by the heat of the gases.

The above mentioned method of conditioning blast furnace gases by adding bituminous coal, oil or tar at the top of the furnace, has been found to be particularly advantageous, and especially adapted to the conditions of blast furnace operations.

For example, bituminous coal may be charged to the blast furnace by adding it in suitable amount to the ore, coke, or limestone being charged, as by weighing the desired amount of coal onto the top of the skip cars containing the burden.

This method of carrying out the invention has a number of advantages. It does away with the necessity of any special apparatus for conditioning the gases; it requires a minimum of labor; and since the amount of conditioning material added is proportioned to the amount of the charge, the concentration of conditioning agent in the gases is automatically adjusted to varying conditions of operation.

In general it has been found that the addition to the charge of from 25 to 90 pounds of bituminous coal per ton of pig iron produced is very effective in conditioning the blast furnace gases for electrical precipitation. However, the addition of larger or smaller amounts may be found to be desirable under certain conditions of operation.

As an example of the effect of adding bituminous coal to a blast furnace, the following comparative tests, made with a vertical plate precipitator, with all conditions equivalent except that 65 pounds of coal per ton of pig iron produced was added to the charge in test Series I, are given:

|  | I With coal | II Without coal |
|---|---|---|
| Duration of test | 11 days | 27 days |
| Average gas volume | 10,650 cu. ft./min. | 10,845 cu. ft./min. |
| Temperature in precipitator | 358° F. | 366° F. |
| Dust removal | 96.2% | 88% |
| Dust content—clean gas | .066 grs./cu. ft. | .292 grs./cu. ft. |
| Kilovolts—high tension | 53.5 | 49.3 |
| Amperes—low tension | 25.2 | 42 |
| Kva consumption | 5.55 | 9.25 |

In the treatment of the gases from carbon-black furnaces, the gases carrying the suspended matter may be carried through some kind of a mechanical mixing apparatus, such as a series of rotating discs dipping into a pool of hydrocarbon liquid.

The hydrocarbons may be injected into the hot gas stream as a fog or mist by a steam or air jet, or may be supplied in the form of still vapors or producer gas carrying volatiles.

In addition to the advantages above mentioned, the use of hydrocarbon vapors, fogs or mists, has further advantages, in that the unprecipitated portion increases the thermal value of gases which, after being freed from dust, are to be burned, while the precipitated portion which is of a tacky or sticky nature is deposited on the collecting electrodes, and serves to prevent the deposited dust and fume-like material from disintegrating into fine particles as it falls off the collecting electrodes, this feature being of particular value when the collecting electrodes are of the semi-conducting type.

This application contains subject-matter in common with my application Serial No. 245,173, filed January 7, 1928, which is directed broadly to the conditioning of gases containing suspended matter by supplying thereto hydrocarbons in a fluid state.

I claim:—

1. A method of purifying blast furnace gases which comprises conditioning the gases by generating hydrocarbons in a fluid state in an amount sufficient to alter the electrical characteristics of the gases in the blast furnace and then passing the gases thus conditioned between electrodes maintained at a high potential difference.

2. A method of purifying blast furnace gases which comprises conditioning the gases by adding to the charge a material capable of generating hydrocarbons in a fluid state in an amount sufficient to alter the electrical characteristics of the gases at the temperature of the blast furnace, and then passing the gases thus conditioned between electrodes maintained at a high potential difference.

3. A method of purifying blast furnace gases which comprises conditioning the gases by adding to the charge a carbonaceous material containing a volatilizable portion thereby generating hydrocarbons in a fluid state in an amount sufficient to alter the electrical characteristics of the gases and then passing the gases thus conditioned between electrodes maintained at a high potential difference.

4. A method of purifying blast furnace gases which comprises conditioning the gases by adding to the charge bituminous coal and then passing the gases thus conditioned between electrodes maintained at a high potential difference.

5. A method of purifying blast furnace gases which comprises conditioning the gases by adding to the charge from about 25 to about 90 pounds of bituminous coal thereby generating hydrocarbons in a fluid state in an amount sufficient to alter the electrical characteristics of the gases per ton of pig iron produced, and then passing the gases thus conditioned between electrodes maintained at a high potential difference.

In testimony whereof, I affix my signature.

CARL W. J. HEDBERG.